United States Patent [19]

Maegawa et al.

[11] Patent Number: 5,602,702
[45] Date of Patent: Feb. 11, 1997

[54] MAGNETIC RECORDING/REPRODUCING APPARATUS HAVING AN OFFSET HEAD CHIP

[75] Inventors: Takaaki Maegawa, Sakurai; Akio Kuroe; Taizou Hamada, both of Katano; Hiroshi Kanchiku, Settsu, all of Japan

[73] Assignee: Matsushita Electric Industrial Co., Ltd., Japan

[21] Appl. No.: 277,841

[22] Filed: Jul. 20, 1994

[30] Foreign Application Priority Data

Jul. 22, 1993 [JP] Japan .................................. 5-181131

[51] Int. Cl.⁶ .......................... G11B 15/60; G11B 5/52; G11B 21/04; G11B 21/18
[52] U.S. Cl. ................ 360/107; 360/130.22; 360/130.24
[58] Field of Search ........................ 360/107, 84, 130.24, 360/85, 130.22, 130.23

[56] References Cited

U.S. PATENT DOCUMENTS

| | | | |
|---|---|---|---|
| 4,392,168 | 7/1983 | Maruyama et al. | 360/130.24 |
| 4,603,360 | 7/1986 | Fujiki et al. | 360/84 |
| 4,890,379 | 1/1990 | Yohda et al. | 360/123 |
| 5,065,267 | 11/1991 | Yohda | 360/104 |
| 5,075,809 | 12/1991 | Heinz et al. | 360/128 |
| 5,184,266 | 2/1993 | Kanai et al. | 360/126 |
| 5,195,002 | 3/1993 | Sakurai | 360/99.08 |
| 5,387,457 | 2/1995 | Sato | 428/141 |

FOREIGN PATENT DOCUMENTS 262709   3/1990   Japan .

*Primary Examiner*—Stuart S. Levy
*Assistant Examiner*—Adriana Giordana
*Attorney, Agent, or Firm*—Renner, Otto, Boisselle Sklar

[57] ABSTRACT

A magnetic recording/reproducing apparatus according to the present invention includes: a fixed cylinder; a rotary cylinder rotatably supported by the fixed cylinder, the rotary cylinder including a disk-shaped magnet in which first areas having a first pole and second areas having a second pole opposite to the first pole are alternately arranged; and a head chip attached to the rotary cylinder, wherein the fixed cylinder has a stator coil for generating a magnetic force between the stator coil and the disk-shaped magnet, thereby rotating the rotary cylinder, and the head chip is placed on the rotary cylinder so that a phase angle θ between a virtual plane including a center of a head gap of the head chip and a rotation axis of the rotary cylinder and one of two polar boundary planes sandwiching the area where the virtual plane traverses satisfies $0.4\alpha \leq \theta \leq 0.6\alpha$, where a central angle of the area is α.

7 Claims, 10 Drawing Sheets

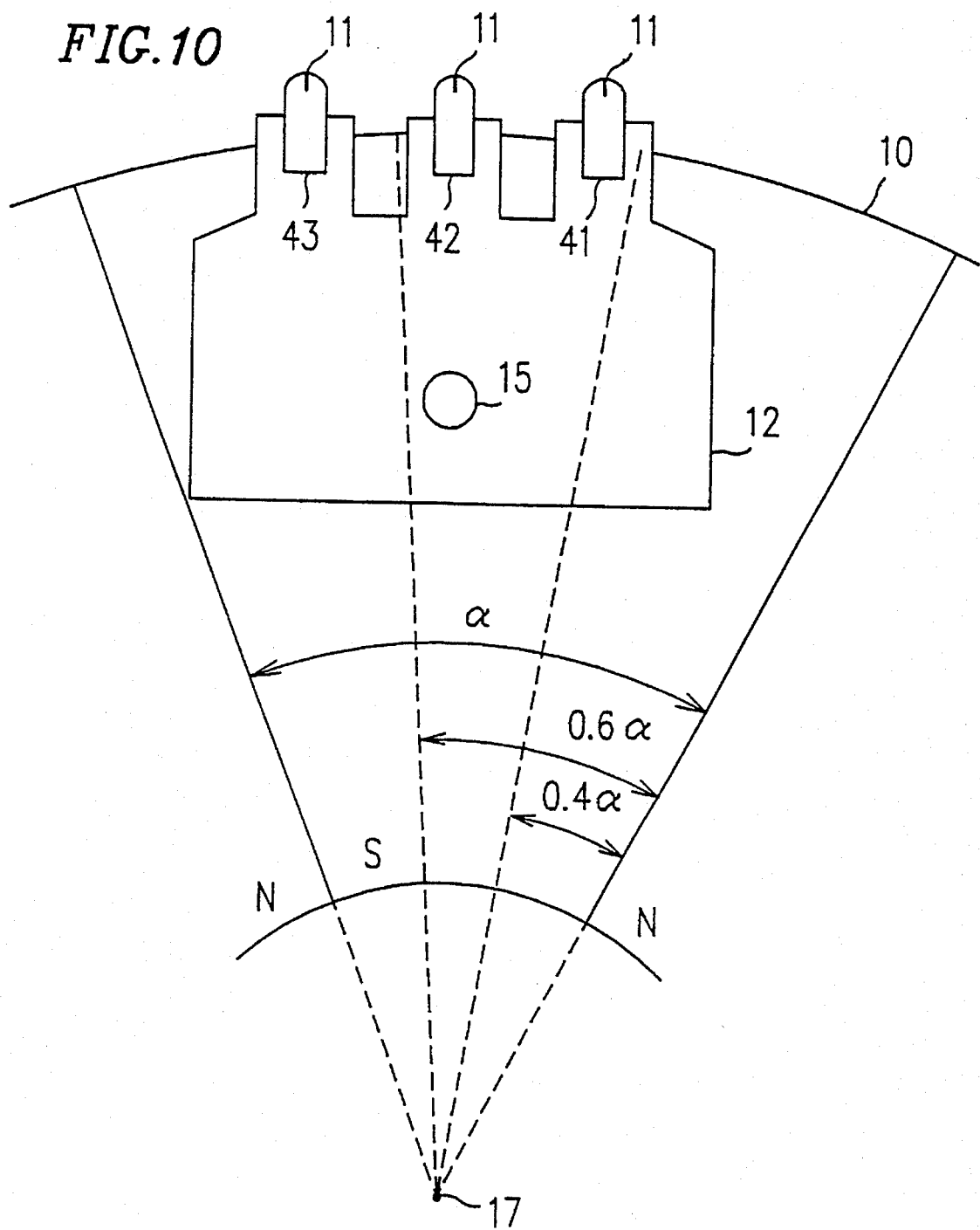

MAGNETIC RECORDING/REPRODUCING APPARATUS HAVING AN OFFSET HEAD CHIP

BACKGROUND OF THE INVENTION

1. Field of the Invention

The present invention relates to a magnetic recording/reproducing apparatus having a rotary cylinder.

2. Description of the Related Art

A magnetic recording/reproducing apparatus such as a video tape recorder (VTR) in which signals are recorded on and reproduced from a magnetic tape has conventionally had a rotary cylinder. A magnetic head for recording/reproducing data on and from a magnetic recording medium is placed on the rotary cylinder. The magnetic head includes a head chip having a winding thereon. When the data is to be recorded, a current is made to flow through the winding, thereby generating a magnetic field from a head gap of the head chip. When the data is to be reproduced, the magnetic field in the head gap of the head chip is changed by the magnetic recording medium, thereby making the current flow through the winding.

A unit of the rotary cylinder includes a motor for rotating the magnetic head. A rotor section of the motor has a disk-shaped multipolar permanent magnet (hereinafter, referred to as a "magnet"). The magnet is subject to a magnetic force from a coil of a stator section of the motor, thereby generating a force for rotating the rotor section.

A typical and conventional arrangement of the head gap of the head chip and the magnet will be described, with reference to FIG. 4. A magnetic head includes an head chip 13 having a winding 14. A magnetic field is generated from a head gap 11 of the head chip 13 by making a current flow through the winding 14. The head chip 13 is fixed to a head base 12. The head base 12 is fixed within a rotary cylinder 21 (see FIG. 2) by a fixing screw 15. The rotary cylinder 21 is rotated by the motor, thereby rotating the head gap 11 of the magnetic head.

The magnetic head, as shown in FIG. 4, is positioned above the magnet 10. The arrangement of the head chip 13 and the magnet 10 is fixed by part of the rotary cylinder 21 and remains unchanged during the rotation of the motor.

In the conventional typical rotary cylinder, the head chip 13 is placed so that the head gap 11 is positioned above the polarity boundary area between the S pole and the N pole of the magnet 10. Even in the case where a combination magnetic head in which two head chips are provided for the head base is adopted, the head gaps are placed above the polarity boundary area between the S pole and the N pole.

These days a compact VTR, for example, a compact video camera is made more and more miniaturized. Accordingly, the rotary cylinder should be small in its size. If the rotary cylinder is miniaturized, the magnet 10 for the motor for rotating the rotary cylinder is placed close to the head chip 13. As a result, the leakage of the magnetic field generated from the magnet 10 is likely to magnetize the head chip 13 of the magnetic head. The magnetization of the head chip 13 causes disadvantageous effects such as a lowering of the reproducing output signal level. For example, the magnetic head chip 13 may erase the tracks recorded on the magnetic tape, resulting in a lowering the reproducing outputs (lowering a signal/noise ratio). Therefore, it is required to reduce this effect due to the leakage of the magnetic field from the magnet 10 to become negligible.

The present invention is designed to solve the above problems, and its objective is to provide a magnetic recording/reproducing apparatus in which the effect of the magnetic field leaked from the magnet for the motor on the head chip is greatly reduced.

SUMMARY OF THE INVENTION

A magnetic recording/reproducing apparatus according to the present invention includes: a fixed cylinder; a rotary cylinder rotatably supported by the fixed cylinder, the rotary cylinder including a disk-shaped magnet in which first areas having a first pole and second areas having a second pole opposite to the first pole are alternately arranged; and a head chip attached to the rotary cylinder, wherein the fixed cylinder has a stator coil for generating a magnetic force between the stator coil and the disk-shaped magnet, thereby rotating the rotary cylinder, and the head chip is placed on the rotary cylinder so that a phase angle θ between a virtual plane including a center of a head gap of the head chip and a rotation axis of the rotary cylinder and one of two polar boundary planes sandwiching the area where the virtual plane traverses satisfies $0.4\alpha \leq \theta \leq 0.6\alpha$, where a central angle of the area is α.

In one embodiment of the invention, a magnetic recording/reproducing apparatus further includes a first magnetic shielding means placed between the head chip and the disk-shaped magnet.

In another embodiment of the invention, the first magnetic shielding means includes a thin plate made of magnetic material having a thickness of 1 mm or less and the head chip is placed so as to have a height of 2.9 mm or less.

In still another embodiment of the invention, a magnetic recording/reproducing apparatus further includes a second magnetic shielding means placed between the fixed cylinder and the stator coil.

In still another embodiment of the invention, the first and second magnetic shielding means are made of high saturation magnetic flux density material.

Alternatively, a magnetic recording/reproducing apparatus includes: a fixed cylinder; a rotary cylinder rotatably supported by the fixed cylinder, the rotary cylinder including a disk-shaped magnet in which first areas having a first pole and second areas having a second pole opposite to the first pole are alternately arranged; and a plurality of head chips attached to the rotary cylinder, wherein the fixed cylinder has a stator coil for generating a magnetic force between the stator coil and the disk-shaped magnet, thereby rotating the rotary cylinder, and at least one head chip among the plurality of head chips is placed on the rotary cylinder so that a phase angle θ between a virtual plane including a center of the head gap of the at least one head chip and a rotation axis of the rotary cylinder and one of two polar boundary planes sandwiching the area where the virtual plane traverses satisfies $0.4\alpha \leq \theta \leq 0.6\alpha$, where a central angle of the area is α.

In one embodiment of the present invention, a difference of phase angles of two head chips having a largest distance therebetween among the plurality of head chips is 0.2α or more.

Alternatively, a magnetic recording/reproducing apparatus includes: a fixed cylinder; a rotary cylinder rotatably supported by the fixed cylinder, the rotary cylinder including a disk-shaped magnet in which first areas having a first pole and second areas having a second pole opposite to the first pole are alternately arranged; and a plurality of head chips attached to the rotary cylinder, wherein the fixed cylinder has a stator coil for generating a magnetic force between the stator coil and the disk-shaped magnet, thereby rotating the rotary cylinder, at least one head chip among the plurality of head chips is a metal in gap (MIG) head chip, and the MIG head chip is placed on the rotary cylinder so that a phase angle θ between a virtual plane including a center of the head gap of the MIG head chip and a rotation axis of the rotary cylinder and one Of two polar boundary planes sandwiching the area where the virtual plane satisfies $0.4\alpha \leq \theta \leq 0.6\alpha$, where a central angle of the area is α.

In one embodiment of the present invention, the head chip placed at the position where the phase angle θ does not satisfy $0.4\alpha \leq \theta \leq 0.6\alpha$ among the plurality of head chips has a substrate made of nonmagnetic material.

In another embodiment of the present invention, the head chip placed at the position where the phase angle θ does not satisfy $0.4\alpha \leq \theta \leq 0.6\alpha$ among the plurality of head chips is a multi-layer amorphous head chip.

In still another embodiment of the present invention, a depth of the head gap of the MIG head chip is 10 μm or less.

According to the present invention, the head chip is placed at the position where the phase angle θ satisfies $0.4\alpha \leq \theta \leq 0.6\alpha$. Since the arrangement of the head chip and the disk-shaped magnet is limited by the above condition, the intensity of the leakage of the magnetic field generated from the disk-shaped magnet in the vicinity of the head chip is smaller as compared with that in the vicinity of the polar boundary plane. Moreover, since the direction of the leakage magnetic field generated from the disk-shaped magnet in the vicinity of the head gap is approximately perpendicular to the direction of magnetic field generated from the head gap, the effect of the leakage of the magnetic field on the head chip is reduced. As a result, the head is prevented from being magnetized by the disk-shaped magnet. Thus, a higher signal output level can be obtained. In other words, the Carrier to Noise ratio (hereinafter "CN ratio"), can be improved.

If a magnetic shielding is placed between the head chip and the disk-shaped magnet, or between the fixed cylinder and the stator coil, the effect of the magnetic field on the head chip can be further reduced. The effect of the magnetic field on the head chip is avoided by using a compact magnetic shielding made of a high saturation magnetic flux density material. For example, if the thickness of the magnetic shielding means and height of the head chip are set at 1 mm or less and 2.9 mm or less, respectively, it is possible to make the cylinder thin, thereby miniaturizing the magnetic recording/reproducing apparatus.

In the case where the magnetic recording/reproducing apparatus has a plurality of head chips, at least the head chips, which should be prevented from being affected by the leakage of the magnetic field are placed at the position where the above condition is satisfied. As a result, the intensity of the leakage of the magnetic field generated from the disk-shaped magnet becomes small as compared with that in the vicinity of polar boundary plane. Moreover, the direction of the leakage of the magnetic field from the disk-shaped magnet in the vicinity of the head gap is approximately perpendicular to the direction of the magnetic field generated from the head gap, thereby avoiding the effect of the leakage of the magnetic field on the head chip.

In the case where the difference of phase angles of two head chips having the largest distance therebetween among the plurality of head chips is 0.2α or more, if at least the head chips, which should be prevented from being affected by the leakage of the magnetic field, are placed at the position where the above condition is satisfied, the arrangement of the other heads is not limited. As a result, it helps in the miniaturization of the rotary cylinder.

Metal-in-gap head chips, herein after referred to as MIG head chips, among the plurality of head chips are placed at the position where the above condition is satisfied. As a result, the effect of the leakage of the magnetic field on the head chip can be restrained. In addition, the MIG head chip is made of high saturation magnetic flux density material and includes a core having e shape suitable for concentrating the magnetic flux on the gap portion (the width of the core becomes narrowest at the gap portion), thereby obtaining a high output signal level.

A head chip having a nonmagnetic substrate can be used as a head chip placed at the position where the above condition is not satisfied among the plurality of head chips. The head chip having the nonmagnetic substrate is made of a material having a small saturation magnetic flux density as compared with that of the MIG head chip and has e shape of the core which does not allow the magnetic flux to be concentrated, thereby reducing the effect of the leakage of the magnetic field.

A gap area can be reduced by setting the gap depth of the MIG head chip at 10 μm or less. The magnetic flux is concentrated on the gap portion by the reduction of the gap area. As a result, a higher signal output level can be obtained.

Thus, the invention described herein makes possible an advantage of providing a magnetic recording/reproducing apparatus capable of reducing the effect of the leakage of the magnetic field from the magnet on the head chip and providing a high output signal level.

This and other advantages of the present invention will become apparent to those skilled in the art upon reading and understanding the following detailed description with reference to the accompanying figures.

BRIEF DESCRIPTION OF THE DRAWINGS

FIG. 10 is a plan view illustrating an arrangement of a head gap of head chip and a magnet in a magnetic recording/ reproducing apparatus having a plurality of head chips according to the present invention.

DESCRIPTION OF THE PREFERRED EMBODIMENTS

Figure 1:
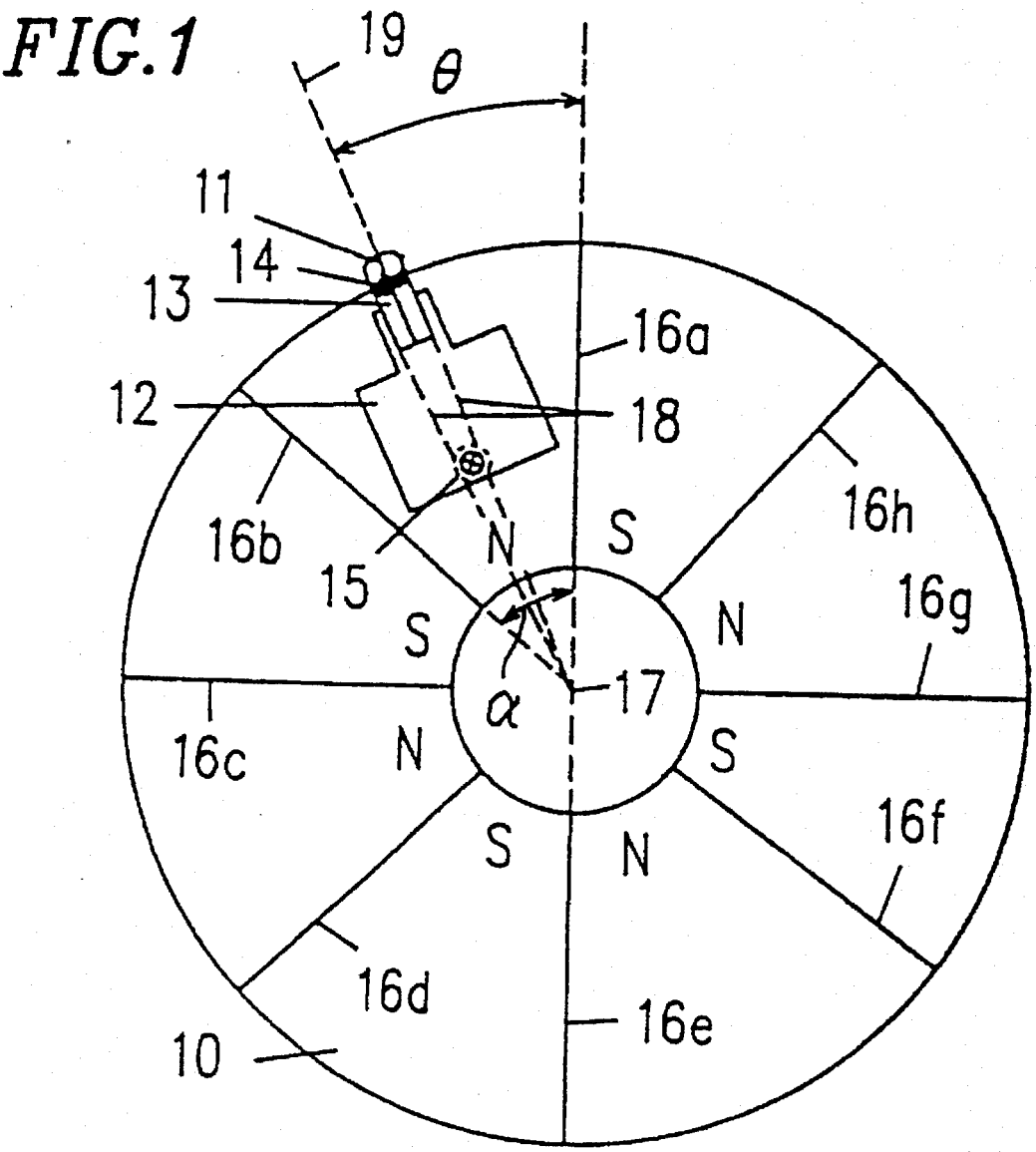
FIG. 1 is a plan view illustrating an arrangement of a head gap of a head chip and a magnet in an example according to the present invention.

Hereinafter, the present invention will be described by way of illustrative examples, with reference to the accompanying drawings. In the figures, components having the same function are indicated by the same reference numerals.

Figure 2:
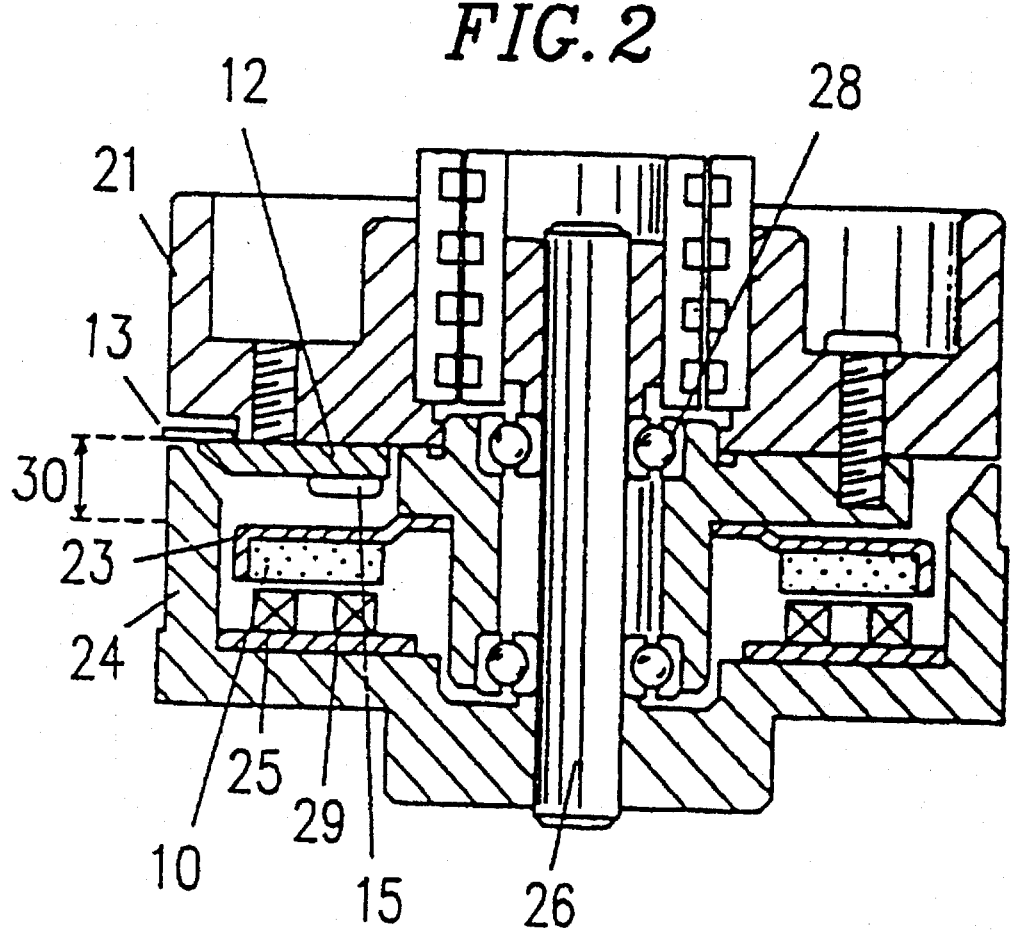
FIG. 2 is a sectional view illustrating a rotary cylinder unit of a magnetic recording/reproducing apparatus.
Figure 3:
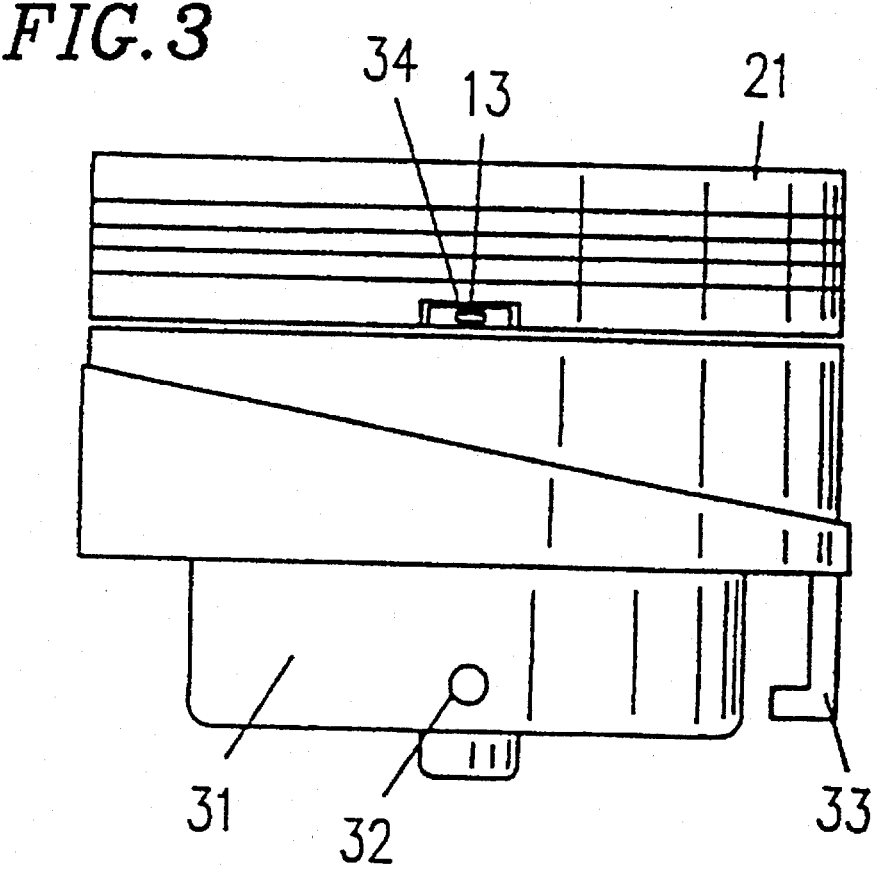
FIG. 3 is an outer view illustrating a rotary cylinder unit of a magnetic recording/reproducing apparatus.

FIG. 3 shows an external shape of a rotary cylinder of a magnetic recording/reproducing apparatus according to the present invention. FIG. 2 is a sectional view of a rotary cylinder unit of the magnetic recording/reproducing apparatus. By the magnetic recording/reproducing apparatus, data is recorded on and reproduced from a magnetic tape serving as a recording medium.

First, the magnetic recording/reproducing apparatus is described with reference to FIG. 3. A head chip 13 which is part of the magnetic head is provided attached to a rotary cylinder 21 of the magnetic recording/reproducing apparatus. A rotor unit 31 for rotating the magnetic head is provided below the rotary cylinder 21. The head chip 13 projects from a window 34 of the rotary cylinder 21. A Phase Generator magnet (hereinafter "PG magnet") 32 is attached on the periphery of the rotor unit 31. The magnetic field generated by the PG magnet 32 changes according to the rotation of the rotor unit 31. Rotational phase detection can be performed by detecting the changes in the magnetic field with a magnetic resistive element 33.

Referring to FIG. 2, the rotary cylinder unit includes a fixed cylinder 24 having a peripheral surface for guiding a magnetic tape, and the rotary cylinder for supporting the magnetic head. The rotary cylinder 21 is supported by the fixed cylinder 24 via a rotary shaft 26 and a bearing 28.

The cylinder unit further includes stator coils 25, a magnet 10 having a disk shape, an upper shielding plate 23, and a lower shielding plate 29. The stator coils 25 are arranged inside the fixed cylinder 24 and drives the rotary cylinder 21. The magnet 10 is a multipolar magnet which is magnetized so as to have N poles and S poles alternately arranged and rotates with the rotation of the magnet 10. The upper shielding plate 23 is made of high saturation magnetic flux density material and covers the magnet 10. The lower shielding plate 29 is made of high saturation magnetic flux density material and provided between the stator coils 25 and the fixed cylinder 24.

In this example, the distance 30 between the surface of the head base 12 on which the head chip 13 is placed and the upper surface of the upper shielding plate 23 (hereinafter, referred to as the "height of the head chip") is 1.9 mm. In a conventional VTR, the height 30 of the head chip 13 is set at 3.4 mm or more. Each of the thicknesses of the upper shielding plate 23 and the lower shielding plate 29 are set at 0.5 mm in this example. The shielding plates 23 and 29 are made of material including Fe or Co.

The arrangement of a head gap 11 of the head chip 13 with respect to the magnet 10 is described with reference to FIG. 1. As shown in FIG. 1, the magnetic head includes the head chip 13 having a winding 14. The head gap 11 is provided for the head chip 13. When data is recorded, a magnetic field is generated from the head gap 11 of the head chip 13 by making a current flow through the winding 14. When data is reproduced, a current flows through the winding 14 by the change in the magnetic field of the head gap 11. In the specification, a "magnetic head" includes both of the head chip 13 having the head gap 11 and the winding 14 and the head base 12 to which the head chip 13 is fixed. The magnetic head having two head chips and the magnetic head having three head chips may be called a "combination magnetic head" and a "multi magnetic head", respectively. The head base 12 is fixed to the rotary cylinder 21 by the fixing screw 15. The head gap 11 of the magnetic head rotates with the rotation of the rotary cylinder 21 due to the motor.

The disk-shaped magnet 10 is divided into a plurality of fan-shaped areas by virtual planes (hereinafter, referred to as "polar boundary planes") which pass the boundaries between the S and N poles of the magnet 10 end are perpendicular to the upper surface of the magnet 10. The magnet 10 of this example has eight poles. Each of the fan-shaped areas (which corresponds to single magnetic poles) sandwiched between adjacent planes of polar boundary planes 16a to 16h has a central angle α of 45°.

As shown in FIG. 1, the head gap 11 is placed so as not to traverse the polar boundary areas 16a to 16h. In FIG. 1, two auxiliary lines 18 connecting both ends of the head chip 13 with the center 17 of the rotary shaft 26 of the rotary cylinder 21 are also shown. As can be seen in this figure, the both ends of the head chip 13 as well as the head gap 11 do not traverse the polar boundary planes 16a to 16h. In other words, the auxiliary lines 18 are positioned between the polar boundary planes 6a and 16b which are the closest to the head gap 11.

A direct-current erasure characteristic is used as the measure of the effect of the leakage of the magnetic field caused by the magnet 10. The direct-current erasure characteristic shows the degrees to which tracks formed on the magnetic tape are erased due to the magnetization of the head chip 13. More specifically, the direct-current erasure characteristic is defined by a CN ratio. Hereinafter, how the CN ratio changes while varying the arrangement of the head chip 13 with respect to the polar boundary plane 16a is measured.

Figure 4:
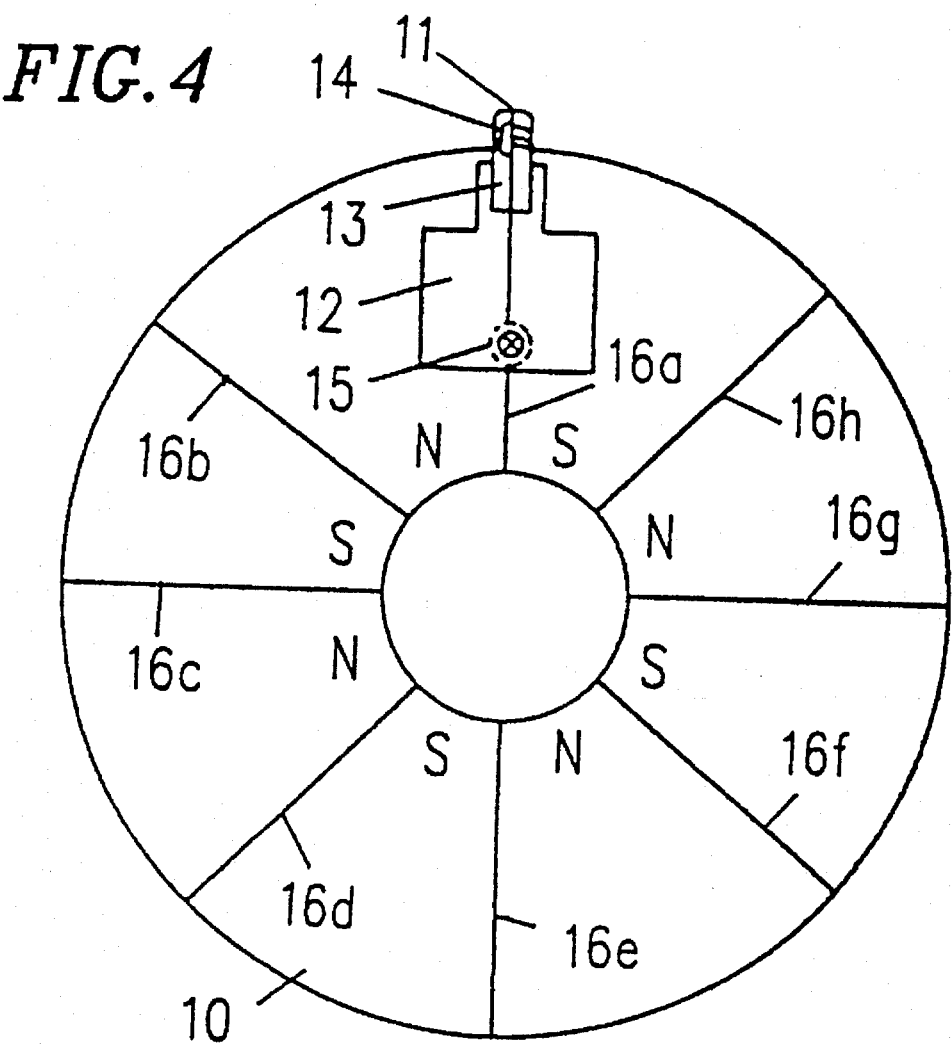
FIG. 4 is a plan view illustrating an arrangement of a head gap of a head chip and a magnet according to a conventional example.

First, the direct-current erase characteristic is described regarding a "single magnetic head" in which the single head chip 13 is fixed to the head base 12. A phase angle θ is herein introduced as a value defining the arrangement of the head gap 11 and the magnet 10 (see FIG. 1). The "phase angle θ" indicates an angle between a virtual plane 19 including the center of the head gap 11 of the head chip and a rotation axis 17 of the rotary cylinder 21 and one of the polar boundary planes 16a and 16b sandwiching the fanshaped area where the virtual plane 19 traverses. The polar boundary plane 16a is selected as "said one of the polar boundary planes 16a and 16b". This is because the phase angle θ measured from the polar boundary plane 16a increases when the head gap 11 rotates in a counterclockwise direction with respect to the magnet 10. In the state where the head gap 11 is placed so as to traverse the polar boundary plane 16a (see FIG. 4), the phase angle is equal to 0°.

The experimental conditions are described as follows:

(1) The CN ratio is measured while shifting the head chip 13 by varying the phase angle θ in the range of 0° to 40°.

(2) In the CN ratio, C (carrier) is a single carrier of 20.9 MHz (a recording wavelength of 0.49 μm), and N (noise) is an average value of the total noise at 18.6 MHz and 23.3 MHz. The same CN ratio is used for the following CN ratio.

(3) A metal in gap (MIG) head chip is used as the head chip 13. The core of the MIG head chip 13 is made of ferrite.

Since the metal portion of the MIG head chip has a high saturation magnetic flux density as compared with a head chip made of ferrite, a high output signal level can be obtained. In addition, the width of the head core is made to be narrow in the head gap portion so as to concentrate the magnetic flux on the head chip 13, thereby obtaining a high output signal level. The MIG head chip 13, however, has a disadvantage of being susceptible to the magnetic field from the outside due to the concentration of the magnetic flux. The width of the core of the MIG head chip 13 is 60 μm.

(4) A metal evaporation tape (generally called an ME tape) having a coercive force of 1500 Oe is used as a recording medium.

(5) A converted VTR (VHS deck) for domestic use on the market is used as a magnetic recording/reproducing apparatus. The cylinder unit for a digital VTR having a diameter of 21.7 mm is herein employed.

Figure 5:
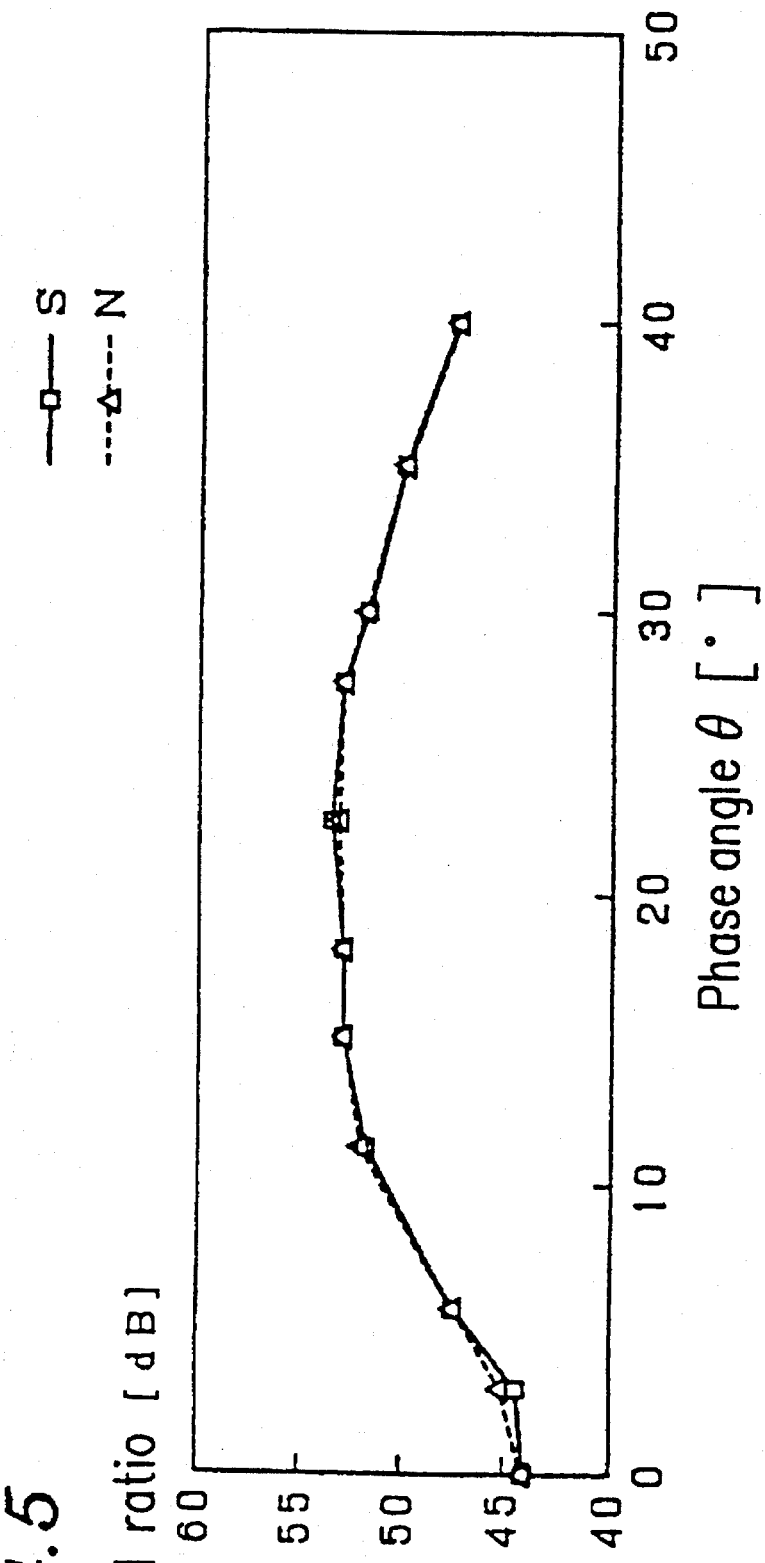
FIG. 5 is a graph showing a change in the CN ratio while varying a phase angle θ.

A graph of FIG. 5 shows the change in the CN ratio while varying the phase angle θ (when the head chip 13 is shifted on the magnet 10).

The CN ratio is 53 dB when the leakage magnetic field has no effect on the head chip 13. Therefore, the degree of the lowered output signal level can be obtained from the difference between the CN ratio and 53 dB. For example, the CN ratio obtained by the head chip 13 placed at the position where the phase angle θ is 0° is 44 dB. The value is lower by 9 dB than the CN ratio obtained in the state where the leakage magnetic field has no effect on the head chip 13. Thus, 9 dB, the difference of CN ratios, is due to the lowering of the output signal level caused by the leakage magnetic field.

When the phase angle θ is 6°, the CN ratio is 48 dB. The obtained value is lower by about 5 dB than the CN ratio obtained in the state where the leakage of the magnetic field has no effect on the head chip 13. The obtained value of 48 dB, however, is improved by about 4 dB as compared with the value obtained in the state where the phase angle θ is 0°. Therefore, it is understood that the increase in the phase angle θ tends to prevent the CN ratio (i.e., output) from lowering in the vicinity where the phase angle is 0°.

In the graph of FIG. 5 the CN ratio becomes 53 dB (the value obtained in the state where the leakage magnetic field has no effect on the head chip 13) in the case where the phase angle θ is 18° or more. The CN ratio is not lowered until the phase angle θ becomes 27°. When the phase angle θ exceeds 27°, the CN ratio is lowered again.

As is apparent from the above description, the region where the leakage of the magnetic field does not lower the output signal level is in the range where the heed chip 13 is shifted from the center line (the position where the phase angle θ is 22.5°) of the fan-shaped area of the magnet 10 within 10% (±4.5°) of the central angle α of the fan-shaped area. In other words, the condition which the phase angle θ should satisfy in order to prevent the head chip from lowering the CN ratio due to the leakage of the magnetic field (hereinafter, referred to as "conditions for avoiding the effect of leakage of the magnetic field") is obtained from the following Inequality:

$$0.5\alpha - 0.1\alpha \leq \text{phase angle } \theta \leq 0.5\alpha + 0.1\alpha$$

that is, $$0.4\alpha \leq \text{phase angle } \theta \leq 0.6\alpha \quad \text{Inequality (1)}$$

where α indicates the central angle of the fan-shaped area of the magnet 10 (in the case where the magnet 10 has eight poles, α=45°).

There are at least two reasons why the effect of the leakage of the magnetic field is small in the above range. The reasons are as follows:

The magnetic field intensity in the vicinity of the center line (phase angle θ=0.5α) of each fan-shaped area of the magnetic field 10 is smaller than that in the vicinity of the polar boundary planes 16a to 16h.

The direction of the magnetic field generated by the magnet 10 in the vicinity of the center line of each fan-shaped area of the magnet 10 is approximately perpendicular to the direction of the magnetic field generated from the head gap 11 during the recording and reproducing of data. The distribution of the magnetic field generated from the magnet 10 is such that each of the fan-shaped areas has the same distribution pattern. Therefore, as shown in FIG. 5, the graph showing the CN ratio of the fan-shaped area having an S pole of the magnet 10 (indicated by a solid line) is substantially identical with that of the fan-shaped area having an N pole (indicated by a dotted line). It is understood from the graph of FIG. 5 that the phase angle θ preferably satisfies the following Inequality:

$$0.5\alpha - 0.05\alpha \leq \text{phase angle } \theta \leq 0.5\alpha + 0.05\alpha$$

In the case where a magnet having sixteen poles is used as the magnet 10, the central angle α of the fan-shaped area is 22.5. Substituting α=22.5° for the above "condition for avoiding the effect of leakage magnetic field" (i.e., 0.5α–0.1α≤ phase angle θ≤0.5α+0.1α) gives the range where the leakage of the magnetic field has no effect on the head chip 13 (output signal level) (specifically, 22.5°–2.25°≤ phase angle θ≤22.5°+2.25°). In the case of the magnet having thirty-two poles, if the head gap is placed in the region where Inequality: 11.25°–1.125°≤ phase angle θ≤11.25°+1.125° is satisfied in the same manner as described above, the effect of leakage magnetic field can be avoided.

Figure 6:
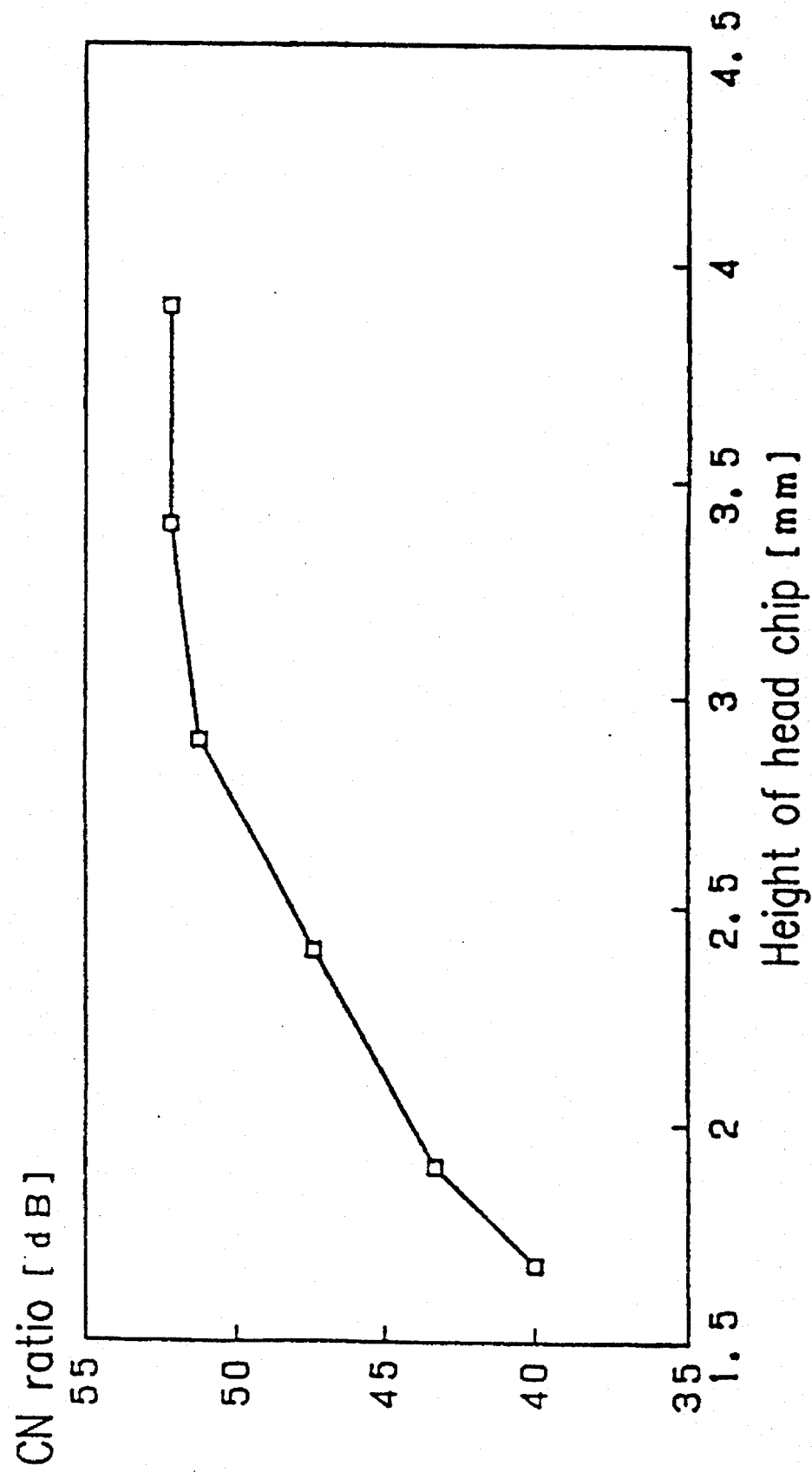
FIG. 6 is a graph showing a change in the CN ratio while varying a height of head chip in the case where a phase angle θ is 0°.

Next, the effect of magnetic field on an output signal level (CN ratio) while varying the "height of head chip" is examined. The graph of FIG. 6 shows the CN ratio while varying the height 30 of head chip 13 in the case where the phase angle θ is 0°. As shown in the graph of FIG. 6, in the case where the height 30 of the head chip 13 is set at 1.9 mm, the CN ratio is 44 dB. The obtained value is lower than 53 dB, which is regarded as a standard value, by 9 dB. When the height of head chip is set at a smaller value, i.e., 1.7 mm, the CN ratio is 40 dB. The obtained value is further lower than the 53 dB standard value, 53 dB, by 13 dB. When the height of head chip is made larger to be 2.9 mm, the CN ratio is 52 dB. The obtained value is lower then the 53 dB standard value by only 1 dB. When the height of the head chip is made larger to be 3.4 mm, the CN ratio is 53 dB. Thus, the CN ratio is not lowered any more.

Figure 7:
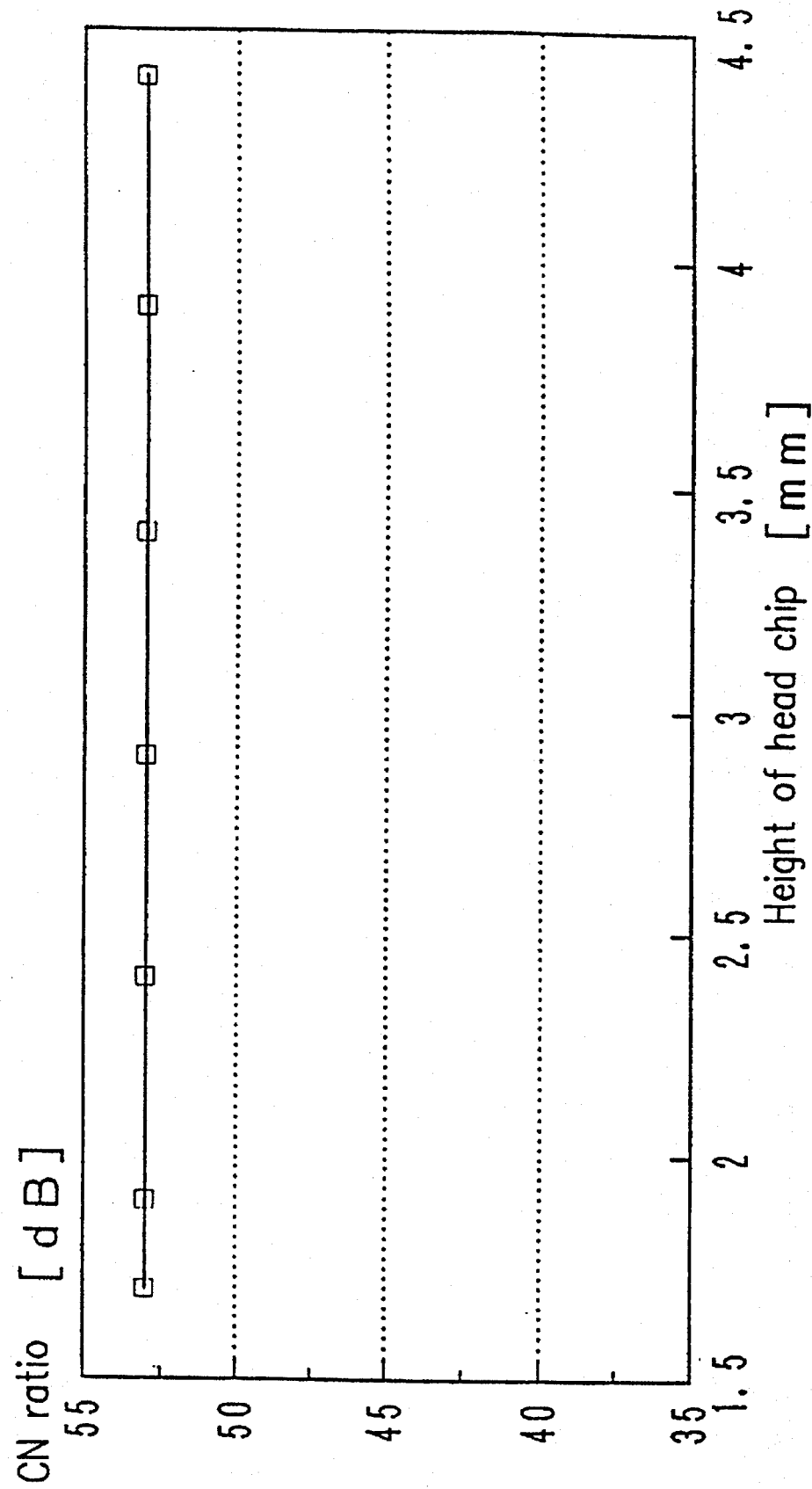
FIG. 7 is a graph showing a change in the CN ratio while varying a height of head chip in the case where phase angle θ=0.5α=22.5°.

Next, the graph of FIG. 7 shows the CN ratio while varying the height 30 of head chip 13 in the case where the phase angle θ=0.5α=22.5° (where the central angle α=45°). As shown in the graph of FIG. 7, when the phase angle θ is set at 22.5, the CN ratio remains as the standard value of 53 dB in the region where the height 30 of head chip 13 is in the range of 1.7 mm to 3.4 mm. Because of this, even If the head chip 13 and the magnet 10 approach each other, for example, the height 30 of the head chip 13 is set at 2.9 mm or less, the CN ratio can be prevented from being lowered as long as the phase angle θ is 0.5α.

As described above, the leakage of the magnetic field has no effect on the head chip in the case where 0.4α≤ phase angle θ≤0.6α and the height 30 of head chip is 2.9 mm or less. The height of head chip may be set at 1.7 mm or less as long as the phase angle satisfies the following Inequality: 0.4α≤ phase angle θ≤0.6α.

In the case where the thickness of the upper shielding plate 23 is less than 0.5 mm, the head chip is susceptible to the effects of the leakage of the magnetic field. The implementation of the present invention makes it possible to effectively prevent the leakage of the magnetic field from having an effect on the head chip in the case where the thickness of the upper shielding plate is less than 0.5 mm.

Figure 8:
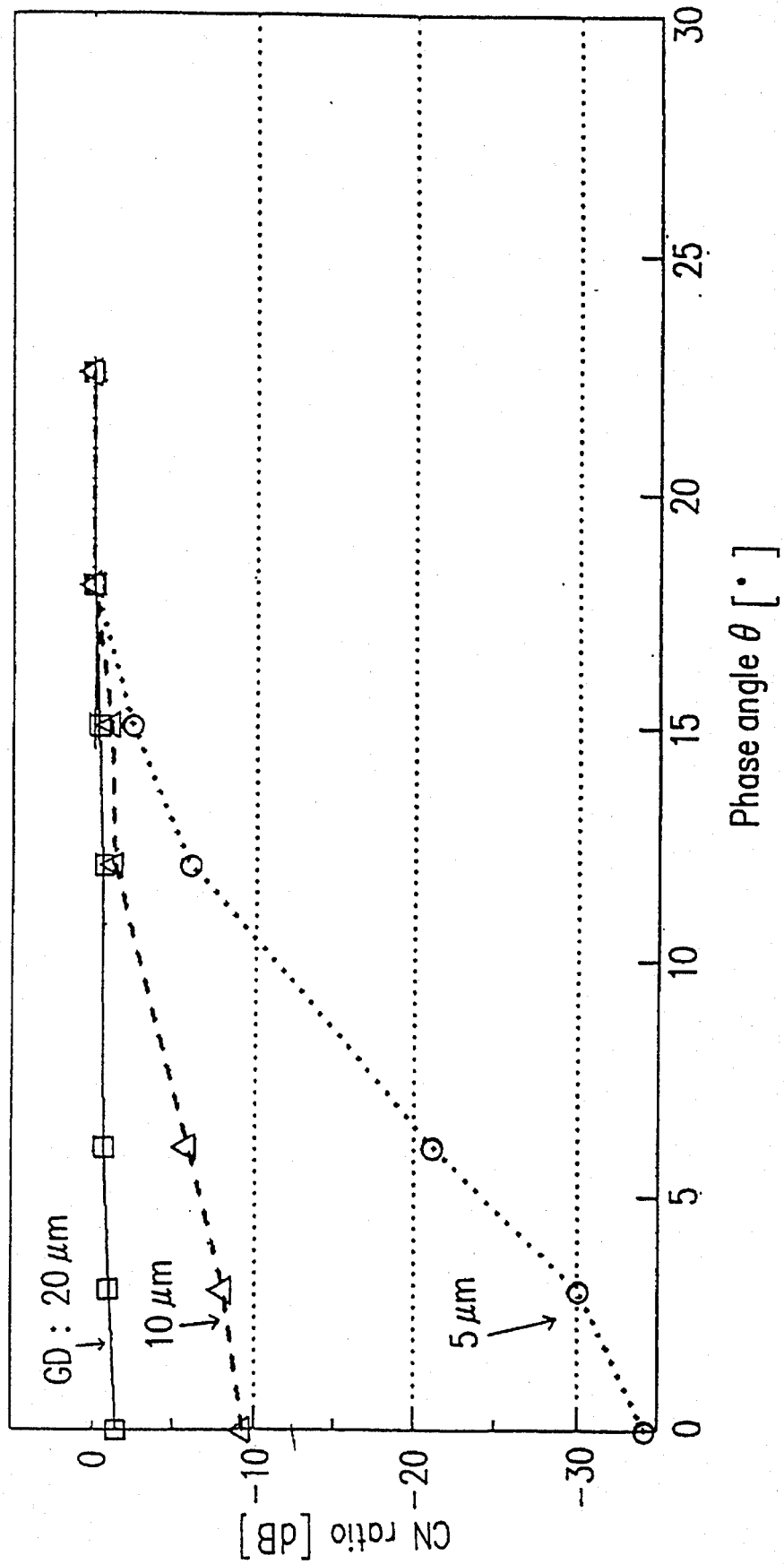
FIG. 8 is a graph showing a change in the CN ratio while varying a phase angle θ in the case where gap depths (GDs) are 20 μm, 10 μm, and 5 μm, respectively.

Next, the relationship between the gap depth (GD) of the head chip 13 and the leakage magnetic field is examined. The gap depth of the head chip used in the preceding experiment was 10 μm. The CN ratios when the MIG head chips having the gap depths of 20 μm, 10 μm, and 5 μm, respectively, are shown in FIG. 8. Herein, the CN ratio in the case where the leakage magnetic field has no effect on the head chip is set at 0 dB. As is apparent from the experiment, the smaller the gap depth becomes, the more the head gap is susceptible to the effect of the leakage of the magnetic field. This is because the small gap width (small gap area) concentrates the magnetic flux on the gap portion.

On the other hand, in the case where the gap of the head chip is placed in the range where the phase angle θ satisfies $0.4\alpha \leq$ phase angle $\theta \leq 0.6\alpha$ (where α is a central angle of a fan-shaped area of the magnet 10), the CN ratio is not lowered regardless of the gap depth. This is because the head chip is not affected by the leakage magnetic field when the head chip is placed in the above range, thereby preventing the head chip from being magnetized. In general, the smaller the gap depth of the head chip becomes, the more the reproducing efficiency rises and the higher the level of output becomes. Because of this, in the case where a wavelength of recording signal is remarkably small, for example, about 0.5 μm, in the magnetic recording/reproducing apparatus such as a digital VTR, the gap depth is generally about 10 μm. Especially, in the case where the head chip having the gap depth of less than 10 μm, the head chip is susceptible to the effects of the leakage of the magnetic field. This prevents the head chip from being affected by the leakage of the magnetic field where the gap of the head chip is placed in the range so the phase angle θ satisfies $0.4\alpha \leq$ phase angle $\theta \leq 0.6\alpha$. This is an effective method for preventing the CN ratio from being lowered.

Although the case where the head chip is an MIG head chip is described in the above example, other head chips (for example, a multi-layer amorphous head chip utilized for a VTR) may alternatively be used. For example, a head chip including an amorphous portion made of Co-Nb-Ta-Zr and substrates sandwiching the amorphous portion made of nonmagnetic $NiO-TiO_2-MgO$ can be used. The width of the head core including the width of the substrate is 60 μm, end the width is the same as that of the MIG head chip.

Figure 9:
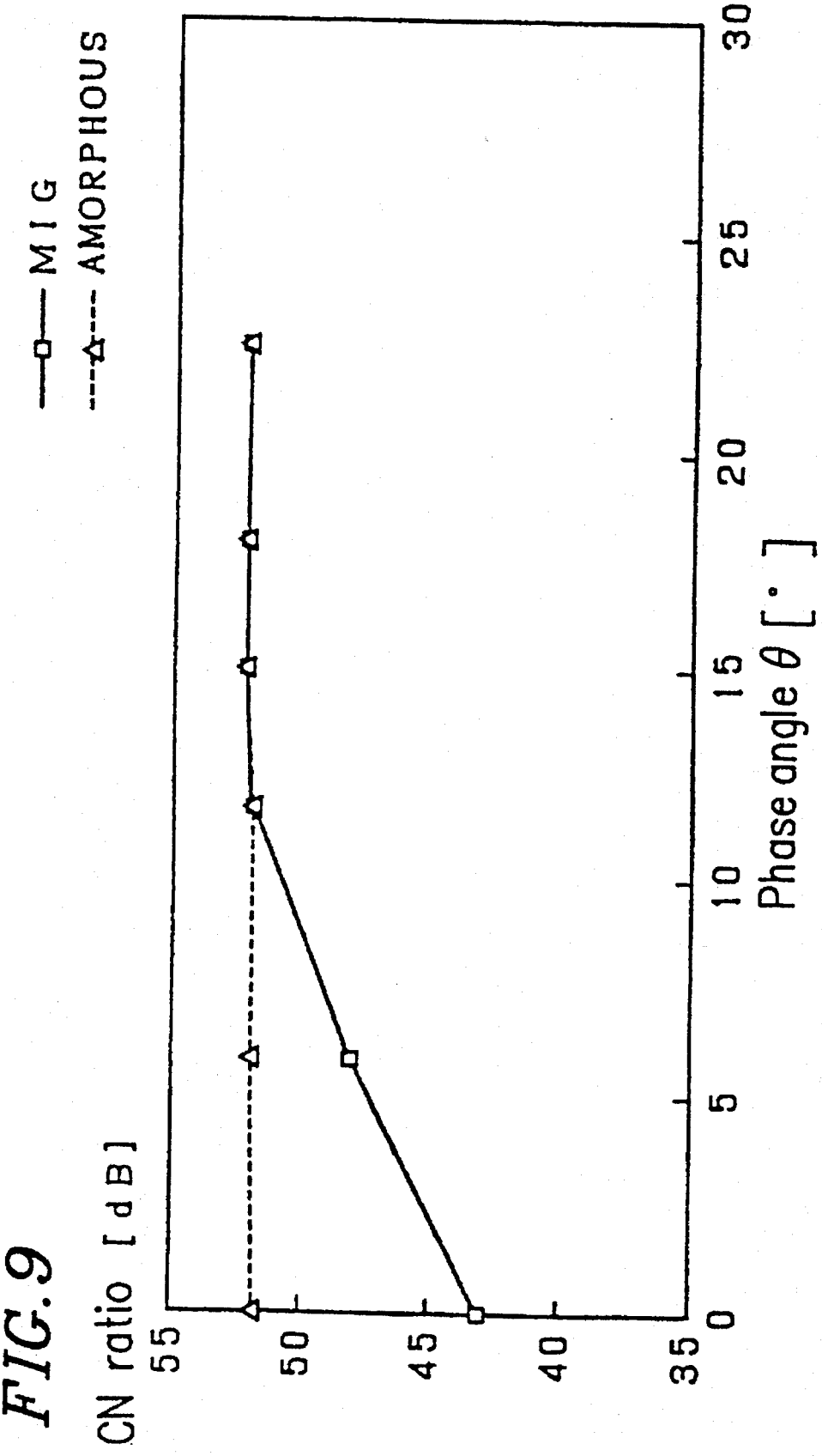
FIG. 9 is a graph showing a change in the CN ratio while varying a phase angle θ in the case where head chips are an MIG head chip and a multi-layer amorphous head chip.

In order to estimate the effects of the leakage of the magnetic field on the head chip, the following experiment was carried out, using in the first experiment. The result of the experiment is shown in FIG. 9. As is understood from FIG. 9, in the case where the height of head chip and the phase angle θ are set at 1.9 mm and 0°, respectively, the CN ratio is lowered by 0.5 dB. This lowering is not as remarkable as that of the CN ratio of the MIG head chip. Thus, it is found that the multi-layer amorphous head chip is less susceptible to the effect of the leakage of the magnetic field than the MIG head chip. The reason can be explained as follows:

The multi-layer amorphous head chip has a magnetic amorphous layer flatly laminated on a nonmagnetic substrate and another nonmagnetic substrate formed thereon. The width of the head core of the multi-layer amorphous head chip is small as compared with that of the MIG head chip. Moreover, since the multi-layer plate is sandwiched between the nonmagnetic substrates, the degree of the magnetization of the head chip due to the leakage of the magnetic field from the magnet 10 is reduced.

Most of the MIG head chips are made of iron-type materials having high saturation magnetic flux density as compared with the multi-layer amorphous head chips. The shape of the head core is suitable for concentrating the magnetic field on the head gap so as to obtain a high output signal level. Because of this, when the magnetic field is generated in the vicinity of the core of the head chip, the magnetic field is likely to be concentrated on the head gap (the head chip is likely to be magnetic), thereby lowering the output.

In the preceding example, the MIG head chip and the multi-layer amorphous head chap are used. However, the present invention is applicable to other head chips.

A magnetic recording/reproducing apparatus having a plurality of head chips according to the present invention will be described with reference to FIG. 10. In order to prevent all the head chips from being affected by the leakage of the magnetic field generated from the magnet 10, all the head chips are preferably placed at the position where the above Inequality (1) is satisfied. In reality, however, it may be difficult to place all the head chips at the position Where Inequality (1) is satisfied. The reasons for this are as follows:

In the case of VTRs for business use, a plurality of head chips are often mounted on a single head base. On the other hand, the diameter of the rotary cylinder is being made smaller still as the apparatuses are miniaturized. However, the size of head chip and the distance between the head chips are not made smaller along with the miniaturization of the rotary cylinder. Therefore, it is not easy to place all the head chips at the position where the head chips are hardly affected by the leakage magnetic field. In the case where the difference of phase angles of the two head chips having the largest distance therebetween among the plurality of head chips is 0.2α or more (where α is a central angle of a fan-shaped area of the magnet), all the head chips do not satisfy Inequality (1).

In FIG. 10, a plurality of head chips are placed on the rotary cylinder. In this case, three head chips 41, 42, and 43 are fixed to a head base 12. In the case where it is impossible to place all the three head chips at the position where the he head chips are not affected by the leakage magnetic field for the above reasons, the head chips 41 and 42 which are susceptible to the effect of the leakage of the magnetic field such as MIG-type head chips are preferentially placed at the position where Inequality (1) is satisfied. The head chip 43 which is less susceptible to the effect of the leakage of the magnetic field such as a non-MIG-type head chip may be placed outside the region where Inequality (1) is satisfied. The multi-layer amorphous head chip as described above may be used as a non-MIG head chip.

With the arrangement as described above, a plurality of head chips can be placed with a higher degree of freedom on a miniaturized rotary cylinder while avoiding the effect of leakage magnetic field.

In the preceding example, although a metal evaporation tape is used as a recording medium, other tapes such as a Co-type iron oxide tape, a metal particulated tape (MP tape), and a CoCr tape which have a different coercive force from that of the metal evaporation tape may alternatively be used.

According to the present invention, the head chip is placed at the position where the phase angle θ satisfies Inequality $0.4\alpha \leq$ phase angle $\theta \leq 0.6\alpha$, whereby the head chip is prevented from being magnetized by the disk-shaped magnet. As a result, a higher output signal level can be obtained (i.e., the CN ratio can be improved).

If a magnetic shielding is placed between the head chip and the disk-shaped magnet or between the fixed cylinder and the stator coil, the effect of the magnetic field on the head chip is further lowered. The effect of the magnetic field on the head chip is greatly avoided with a compact magnetic shielding made of high saturation magnetic flux density material. For example, with the thickness of the magnetic shielding means and the height of the head Chip are set at 1 mm or less and 2.9 mm or less, respectively, it is possible to make the cylinder thin, thereby miniaturizing the magnetic recording/reproducing apparatus.

In the case where the magnetic recording/reproducing apparatus has a plurality of head chips, if at least the head chips which should be prevented from being affected by the leakage of the magnetic field are placed at the position where the above condition is satisfied, it is possible to effectively avoid the effects of the leakage of the magnetic field.

In the case where the difference of phase angles of two head chips having the largest distance therebetween among the plurality of head chips is $0.2\alpha$ or more, if at least the head chips which should be prevented from being affected by the leakage of the magnetic field are placed at the position where the above condition is satisfied, it is possible to effectively avoid the effects of the leakage of the magnetic field.

The MIG head chips of the plurality of head chips are placed at the position where the above condition is satisfied, thereby obtaining a high output while preventing the magnetic field from affecting the head chips.

A head chip in which a magnetic layer is covered with a nonmagnetic substrate or a multi-layer amorphous head chip is used as a head chip placed at the position where the above condition is not satisfied among the plurality of head chips, thereby reducing the effect of leakage magnetic field.

A gap depth of the MIG head chip is set at 10 µm or less, thereby obtaining a higher signal output level.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed:

1. A magnetic recording/reproducing apparatus comprising:

a fixed cylinder;

a rotary cylinder rotatably supported by the fixed cylinder, the rotary cylinder including a disk-shaped magnet in which first areas having a first pole and second areas having a second pole opposite to the first pole are alternately arranged; and a plurality of head chips attached to the rotary cylinder, wherein the fixed cylinder has a stator coil for generating a magnetic force between the stator coil and the disk-shaped magnet, thereby rotating the rotary cylinder, a first ahead chip among the plurality of head chips is placed on the rotary cylinder so that a first phase angle $\theta$ between a first virtual plane including a center of the head gap of the first head chip and a rotation axis of the rotary cylinder and one of the two polar boundary planes sandwiching an area the first areas and the second areas where which the virtual plane traverses satisfies $0.4\alpha \leq \theta \leq 0.6\alpha$, and a second head chip among the plurality of head chips is placed on the rotary cylinder so that a second phase angle $\theta$ between a second virtual plane including a center of the head gap of the second head chip and a rotation axis of the rotary cylinder and one of the two polar boundary planes satisfies $\theta<0.4\alpha$ or $\theta>0.6\alpha$, where a central angle of the area is $\alpha$.

2. A magnetic recording/reproducing apparatus according to claim 1; wherein a difference of phase angles of two head chips having a largest distance therebetween among the plurality of head chips is $0.2\alpha$ or more.

3. A magnetic recording/reproducing apparatus comprising:

a fixed cylinder;

a rotary cylinder rotatably supported by the fixed cylinder, the rotary cylinder including a disk-shaped magnet in which first areas having a first pole and second areas having a second pole opposite to the first pole are alternately arranged; and a plurality of head chips attached to the rotary cylinder, wherein the fixed cylinder has a stator coil for generating a magnetic force between the stator coil and the disk-shaped magnet, thereby rotating the rotary cylinder, at least one head chip among the plurality of head chips is a metal in gap (MIG) head chip, each of the rest of the plurality of head chips is a non-MIG head chip, the at least one MIG head chip is placed on the rotary cylinder so that a first phase angle $\theta$ between a first virtual plane including a center of the head gap of the at least one MIG head chip and a rotation axis of the rotary cylinder and one of the two polar boundary planes sandwiching an area among the first areas and the second areas which the virtual plane traverses satisfies $0.4\alpha \leq \theta \leq 0.6\alpha$, and each non-MIG head chip is placed on the rotary cylinder so that a second phase angle $\theta$ between a second virtual plane including a center of the head gap of the non-MIG head chip and a rotation axis of the rotary cylinder and one of the two polar boundary planes satisfies $\theta<0.4\alpha$ or $\theta>0.6\alpha$, where a central angle of the area is $\alpha$.

4. A magnetic recording/reproducing apparatus according to claim 3, wherein each head chip placed at the position where the phase angle $\theta$ does not satisfy $0.4\alpha \leq \theta \leq 0.6\alpha$ among the plurality of head chips has a substrate made of nonmagnetic material.

5. A magnetic recording/reproducing apparatus according to claim 3, wherein each head chip placed at the position where the phase angle $\theta$ does not satisfy $0.4\alpha \leq \theta \leq 0.6\alpha$ among the plurality of head chips is a multi-layer amorphous head chip.

6. A magnetic recording/reproducing apparatus according to claim 3, wherein a depth of the head gap of the at least one MIG head chip is 10 µm or less.

7. A magnetic recording/reproducing apparatus comprising:

a fixed cylinder;

a rotary cylinder rotatably supported by the fixed cylinder, the rotary cylinder including a disk-shaped magnet in which first areas having a first pole and second areas having a second pole opposite to the first pole are alternately arranged; and a plurality of head chips attached to the rotary cylinder, wherein the fixed cylinder has a stator coil for generating a magnetic force between the stator coil and the disk-shaped magnet, thereby rotating the rotary cylinder, a first head chip among the plurality of head chips which is most susceptible to effects of magnetic fields is placed on the rotary cylinder so that a first phase angle $\theta$ between a first virtual plane including a center of the head gap of the first head chip and a rotation axis of the rotary cylinder and one of two polar boundary planes sandwiching an area among the first areas and the second areas which the first virtual plane traverses satisfies $0.4\alpha \leq \theta \leq 0.6\alpha$, and a second head chip among the plurality of head chips which is less susceptible to effects of magnetic fields compared to the first head chip is placed on the rotary cylinder so that a second phase angle $\theta$ between a second virtual plane including a center of the head gap of the second head chip and a rotation axis of the rotary cylinder and one of the two polar boundary planes satisfies $\theta < 0.4\alpha$ or $\theta > 0.6\alpha$, where a central angle of the area is $\alpha$.

* * * * *